US008788927B2

(12) United States Patent
Gleadall et al.

(10) Patent No.: US 8,788,927 B2
(45) Date of Patent: Jul. 22, 2014

(54) SYSTEM AND METHOD FOR DISPLAYING WEB PAGE CONTENT

(75) Inventors: George Gleadall, Boca Raton, FL (US); Shawn Stewart, Plantation, FL (US); Ronnie Paskin, Ft. Lauderdale, FL (US)

(73) Assignee: CBS Interactive Inc., San Francisco, CA (US)

( * ) Notice: Subject to any disclaimer, the term of this patent is extended or adjusted under 35 U.S.C. 154(b) by 1 day.

(21) Appl. No.: 13/034,074

(22) Filed: Feb. 24, 2011

(65) Prior Publication Data

US 2012/0221931 A1 Aug. 30, 2012

(51) Int. Cl.
*G06F 17/00* (2006.01)
(52) U.S. Cl.
USPC .......................................................... 715/208
(58) Field of Classification Search
USPC ......................................... 715/205, 208, 234
See application file for complete search history.

(56) References Cited

U.S. PATENT DOCUMENTS

| | | | | |
|---|---|---|---|---|
| 6,141,010 A * | 10/2000 | Hoyle | .......................... | 715/854 |
| 6,182,122 B1 * | 1/2001 | Berstis | .......................... | 709/217 |
| 6,519,648 B1 * | 2/2003 | Eyal | .............................. | 709/231 |
| 6,523,027 B1 * | 2/2003 | Underwood | .......................... | 1/1 |
| 6,654,734 B1 * | 11/2003 | Mani et al. | .......................... | 1/1 |
| 7,103,594 B1 * | 9/2006 | Wolfe | .......................... | 707/706 |
| 2003/0088580 A1 * | 5/2003 | Desai et al. | ................. | 707/104.1 |
| 2005/0022115 A1 * | 1/2005 | Baumgartner et al. | ....... | 715/513 |
| 2005/0198042 A1 * | 9/2005 | Davis | .............................. | 707/10 |
| 2006/0047804 A1 * | 3/2006 | Fredricksen et al. | ......... | 709/224 |
| 2007/0079236 A1 * | 4/2007 | Schrier et al. | .................. | 715/517 |
| 2007/0174258 A1 | 7/2007 | Jones et al. | | |
| 2008/0115047 A1 | 5/2008 | Petri | | |
| 2008/0163193 A1 * | 7/2008 | Hayton et al. | ................ | 717/173 |
| 2008/0263135 A1 | 10/2008 | Olliphant | | |
| 2009/0254572 A1 * | 10/2009 | Redlich et al. | ................... | 707/10 |
| 2009/0276488 A1 * | 11/2009 | Alstad | ........................... | 709/203 |
| 2010/0306249 A1 | 12/2010 | Hill et al. | | |
| 2011/0296391 A1 * | 12/2011 | Gass et al. | ..................... | 717/168 |
| 2012/0180083 A1 * | 7/2012 | Marcus | ........................... | 725/32 |
| 2012/0331137 A1 | 12/2012 | Olsen et al. | | |

OTHER PUBLICATIONS

Gervase Markham, "Mouseover Prefetch?", 10 pages (2009), available at http://blog.gerv.net/2009/05/mouseover_prefetch/.*
Phillip Tellis, "Rich, accessible pagination with unobtrusive javascript," tech.bluesmoon.info blog, 18 pages (2006), available at http://tech.bluesmoon.info/2006/02/rich-accessible-pagination-with.html.*
Burns, "So, You Want to Pre-Load, Huh?," HTML Goodies blog, 7 pages (May 2010), available at http://www.htmlgoodies.com/tutorials/web_graphics/article.php/3480001/So-You-Want-To-Pre-Load-Huh.htm.*

(Continued)

*Primary Examiner* — Laurie Ries
(74) *Attorney, Agent, or Firm* — Mahamedi Paradice LLP (57) ABSTRACT

A system and method for presenting web page content to a user. A plurality of links are identified on a web page which share a designated characteristic. A user action is detected that indicates a user's intent to select a particular link. As a response to the user action, the resource of the particular link is cached. In response to detecting that the user selects the particular link, content is presented to the user that is based at least in part on the cached resource.

20 Claims, 4 Drawing Sheets

(56) References Cited

OTHER PUBLICATIONS

StackOverflow, "Delay jQuery Hover Event?," 4 pages (Jan. 2009), http://stackoverflow.com/questions/435732/delay-jquery-hover-event.*

Non-Final Office Action mailed Oct. 1, 2013, for related U.S. Appl. No. 13/399,833, filed Feb. 17, 2012, 17 pages.
Final Office Action mailed May 12, 2014, for related U.S. Appl. No. 13/399,833, filed Feb. 17, 2012, 20 pages.

* cited by examiner

SYSTEM AND METHOD FOR DISPLAYING WEB PAGE CONTENT

TECHNICAL FIELD

Embodiments described herein pertain to a system and method for displaying website content.

BACKGROUND

Web browsing activity on the web places emphasis on the ability to serve user requests with speed. Increasingly, user interaction with web sites and content is measured in milliseconds. At the same time, websites are incorporating more numerous and complicated functionality. A browser may make numerous requests in order to render a page. The latency associated with the various requests increases the user wait time during when browsing.

DETAILED DESCRIPTION

Embodiments described herein provide a system and method for presenting web page content. More specifically, embodiments provide for a browser component (or other application) to execute functionality that enables one or more links displayed on a web page to be pre-selected in anticipation of a user's imminent or eventual selection.

According to some embodiments, elements from a page that is retrieved during pre-selection are integrated into a host page in response to the user making an actual selection of a corresponding link. Select elements from the retrieved page are integrated into a host page in a manner that simulates, or gives the appearance of, the browser navigating to the page of the selected link. However, the browser component does not navigate away from the host page, and content from the next selected page is displayed to the user in a rapid and seamless fashion.

According to embodiments, a host page is loaded by a browser of a user. The browser executes programmatic functions that asynchronously load one or more additional pages that are anticipated to be selected by the user when the user views the host page. After an additional page is selected by the user, elements of the host page are replaced by elements of the selected page, in order to transition the user into viewing content from the selected page.

In performing the transition, the host page is not replaced by the selected page. Thus, the browser does not navigate away from the hosted page after the transition occurs. Rather, the host page is altered to present content from the selected page. Among other benefits, as the selected page is not downloaded, the various requests that are executed in a page download are avoided. The result is that the user's selection of successive pages results in rapid and seamless rendering of content from those pages.

As provided by various embodiments, additional pages available through the host page are cached in anticipation of the user's selection. The caching operations may request the additional pages using complete and standard Hypertext Transfer Protocol (HTTP) requests. Thus, minimal or no configuration is needed in how the documents are asynchronously served in order to implement embodiments described. At the same time, the user is provided a seamless and highly responsive web environment from which to navigate web pages in succession.

According to some programmatically implemented embodiments, a plurality of links are identified on a web page which share a designated characteristic. A user action is detected that indicates a user's intent to select a particular link. As a response to the user action, the resource of the particular link is cached. In response to detecting that the user selects the particular link, content is presented to the user that is based at least in part on the cached resource.

In some embodiments, the content that is presented to the user is the hosted web page, with one or more portions that are replaced by elements of the cached resource. As such, the user is not navigated away from the web page, but is able to view content from a selected link as an updated portion of the hosted page.

Embodiments recognize that in many web environments, users tend to navigate and toggle (e.g. select link, then select back) within a domain, where the successively presented pages carry many of the same elements. Under conventional approaches, browsers make HTTP requests to retrieve content from each page, resulting in a complete document being requested, even though much of the requested document being requested is present on the page that is currently being displayed. According to some embodiments, a caching process is implemented to selectively retrieve web pages, located by presented links, that are similar (e.g., share many similar elements) to the presented page. When a user actually selects a link that has had its web page cached, the web page that is under presentation to the user is modified to display portions from the cached page. In particular, portions of the cached page that are not present (or are different) from the presented web page replace corresponding portions of the presented web page.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

Figure 1:
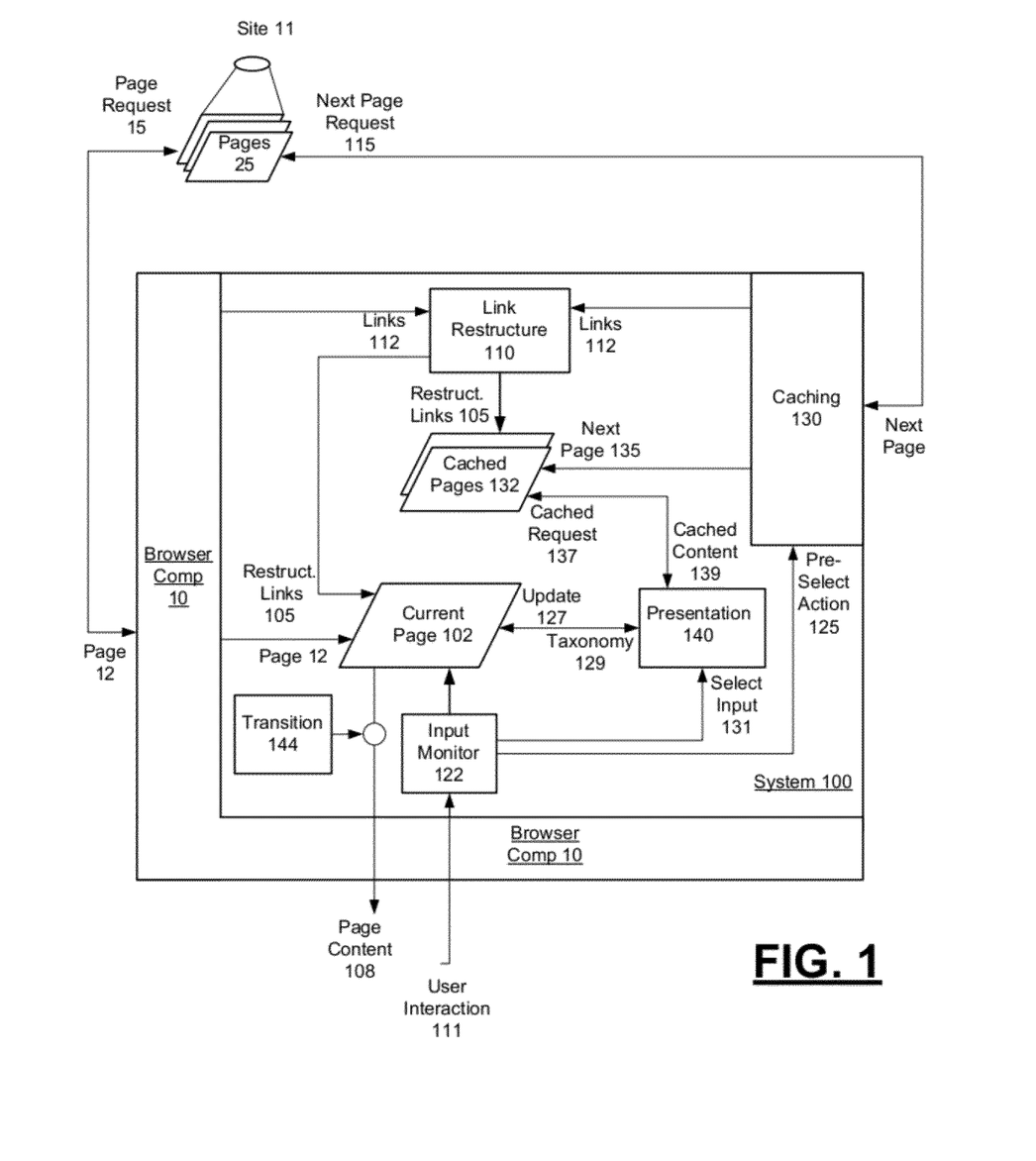
FIG. 1 illustrates a system for presenting web page content, according to various embodiments.

FIG. 1 illustrates a system for presenting web page content, according to various embodiments. A system 100 may be implemented in connection with a user's web browsing experience in order to create a faster, richer and more fluid web browsing experience. In some embodiments, a system 100 is implemented on a user's machine as part of a browsing session. For example, a user may download a webpage, and some or all of the components of the system 100 may be implemented as, for example, executed scripts or processes that are provided to the user's terminal through the page download.

Alternatively, some or all of the components may be implemented as permanent programming components on the user machine. For example, the user's web browser may be configured to include functionality described.

Among other benefits, system 100 may be implemented to create an enhanced web browsing environment, without requiring restructuring or alternations to the web server that responds to requests made from the user. The functionality described with FIG. 1 may be implemented on the user's machine, such as in a session-based medium, to provide functionality described.

The components described with system 100 represent processes or functionality provided by the system. In some implementations, the components may be provided by scripts (e.g. Javascript) that execute on the user's machine through the web browser when a page is downloaded. In one embodiment, system 100 includes components that include an input monitor 122 and a caching component 130.

According to embodiments, system 100 includes components that include link restructure 110, input monitor 122, caching component 130, and presentation 140. The system 100 may be implemented through execution of a browser component 10, which can include a standard commercially available web browser, such as MICROSOFT INTERNET EXPLORER, MOZILLA or GOOGLE CHROME. In other implementations, the browser component 10 corresponds to a web-based application, sometimes referred to as a "web-app." The browser component 10 and the components of system 100 are executed on a computer with networking capabilities (e.g., personal computer, laptop, notebook, tablet, smart phone). In one embodiment, system 100 is implemented when the browser component 10 downloads a webpage 25. The webpage 25 may correspond to a home or main page for a website or domain. In this respect, the web page 25 provides links to various other resources, including internal links to resources provided from the website, as well as external links to third-party resources and advertisements. In loading a home or main page, the browser component 10 makes a page request 15, and receives a page 12 from the site 11. The page request 15 is in the form of a standard Hypertext Transfer Protocol (HTTP) request, in which a full page is requested from the network site 11.

When the page 12 is downloaded, the link restructure 110 identifies links 112 from in the page 25. The link restructure 110 identifies select links which are to be associated with caching functionality (alternatively referred as pre-caching). The select links identified by link structure 110 may be of a class that shares a characteristic which designate those links for caching functionality. In particular, the links identified for pre-caching are those which identify pages that share similar contents or elements. For example, the class of links that are identified by the link restructure 110 are those that locate resources within the same network domain, within a designated domain, or which are direct and internal from the web page.

The link restructure 110 operates to restructure the select links in order to implement pre-caching functionality that is responsive to user actions that indicate the user's intent to select the particular link. In one embodiment, the select links are restructured to include, or be associated with, triggers which cause the caching component 130 to act on the link (e.g., execute an HTTP request to retrieve full document located by link).

Additionally, some embodiments provide that the select links are restructured to alter the default behavior associated with the link. More specifically, the default behavior associated with individual links include (i) responsiveness to link selection by the user, and (ii) instructing the browser to make a new page request for the page located by the particular link. According to one or more embodiments, link restructure 110 alters the default link behavior for the select links of the class, so that the browser component 10 does not act on the link when the user selects it. Rather, the links are associated with the pre-caching functionality, as provided by the caching component 130. Furthermore, while the default functionality associated with the links are responsive to link selection input, the modified functionality provided by the caching functionality associates an alternative trigger with the individual links that are part of select class. This alternative trigger may correspond to any user-interaction 111 that is indicative of the user's intent to eventually select the internal link.

In one implementation, the alternative trigger is a mouse-over or a hover over the particular link. For example, users typically hover for more than 500 ms over a link just prior to selecting it. Rather than triggering the browser to retrieve the page located by the particular restructured link, the link restructure 110 (i) triggers the caching component 130 to make the HTTP page request in response to user mouse-over (or hover) that extends a designated duration (e.g., 50 ms); and (ii) disables the browser component 10 from performing a page request for the document identified by the restructured link in response to the user's subsequent selection input.

Accordingly, some embodiments provide that the browser 10 makes the page request 15 to receive page 12, and the link restructure 110 converts some links of the page into restructured links 105 that exhibit the modified behavior for enabling pre-caching. The current page 102 may comprise the page 12 retrieved by the browser component 10, with restructured links 105. The restructured links 105 may appear to be the same to the user. Thus, the user may have the same interaction with restructured links 105 as with conventional links. The behavior associated with restructured links 105 is, however, different.

The input monitor 122 is provided to monitor the user's interaction 111 with the current page 120. The user interaction 111 may include (i) selection input, where the user selects or acts on a feature of the current page such as a link; (ii) cursor movement, which can result in mouse-over's or link hovering, and (iii) pausing for short durations (e.g., 300 ms). The latter, in connection with mouse-over's or link hovering, may signify user intent to select a particular link (prior to the user actually making the selection). Page content 108 from the current page 102 is provided to the user.

According to an embodiment, the input monitor 122 monitors user interactions to identify links of interest (those links the user is likely to be interested in), or alternatively, links of imminent interest (e.g., those links the user is momentarily about to select). The input monitor 122 may be configured to detect a pre-selection action (or actions) 125 that are indicative that a link is of interest, or alternatively of imminent interest. In particular, some embodiments recognize that user's tend to hover over a link of imminent interest, just prior to selecting the link. Such embodiments implement triggers that identify a short duration of the user's cursor being paused (or hovering) over a link.

If the link is restructured, the caching component 130 is triggered into making a request ("next page request 115") for the document ("next page 135") located by that link. The next page request 115 of caching component 130 may correspond to a HTTP request for the complete page located by the triggered link. The caching component 130 processes the next page 135 to generate the cached page 132. The cached page 132 may also carry restructured links 105. In particular, some embodiments provide that link restructure 110 identifies links of the particular class (e.g., from same domain) from the contents of the next page 135, and restructures those links for maintaining the cached page 132.

According to embodiments, the caching component 130 retrieves pages located by restructured links 105 without advance confirmation that the user actually wants to view the particular page. Accordingly, multiple cached pages 132 can be maintained based on, for example, the user performing multiple pre-selection actions 125. When the user actually selects a restructured link 105 from the current page 102, the input monitor 122 communicates the selection input 131 to the presentation component 140 to implement a page transition. The page transition that is implemented may include replacing portions of the current page 102 with corresponding portions of the cached page 132 located by the selected restructured link 105.

In one embodiment, the presentation component 140 makes a local request 137 for the cached page 139 of the restructured link. The presentation component 140 may automatically replace some elements of the current page 102 with elements of the cached page 132. For example, a content portion of the current page 120 may be replaced by the content portion of the cached page 132.

As an alternative or variation, the presentation component 140 may also compare the elements of the current page 102 to elements of the selected cached page 132 in order to identify what elements are different. For at least some of the elements that are different, the presentation component 140 implements a page update 127 to the current page 120. The page update 127 may include replacing portions of the current page 102 with portions of the cached page which are deemed to be different.

In one embodiment, the presentation component 140 determines differences between the current page 102 and the cached page 132 on a Document Object Model (DOM) basis. Specifically, DOM elements of the current and cached page 132 may be compared under the assumption that the two pages are similar. Those elements that are different may be replaced on the current page 102 with corresponding elements on the cached page 132. For example, the portions of the cached page 132 which are integrated into the current page 120 may include content elements, but not headers or footers.

Still further, in order to identify what portions of the current page 102 are to be replaced, the presentation component 140 may utilize taxonomy 129 of the current page 102. In one implementation, the taxonomy 129 identifies DOM elements of the current page 102, which can be compared to the elements of the cached page 132.

The updates made to the current page 102 may be reflected by the page content 108, which is output to the user. When the current page 102 is updated, the page content 108 is automatically updated to display page with elements from the next page 135. The next page 135 may also include links that are restructured by link restructure 110.

Thus, the current page 102 may be updated repeatedly to include elements of successive page requests made by the user. While a full page request may be made for the next page 135 (and successive pages thereafter), the requests are actually made to cache the next page in advance of its actual selection. Furthermore, the cached page is not displayed to the user. Rather, portions of the cached page are integrated into the current page when user input selects the page for viewing. The result is that the pertinent portions of the next page 135 (e.g., the portions of the next page 135 which are different from the current page 120) are integrated into the current page seamlessly, and quickly as compared to conventional web browsing methods. Duplicative portions of the next page 135, such as provided by the header and footer, are not used in updating the current page 102.

In order to indicate to the user that transition has occurred (and the current page 102 displays contents from the next page), one or more embodiments incorporate a transition feature 144 as part of displaying page content 108 when there is an update to the current page. The transition feature 144 may be rendered to signify to the user that pertinent portions of the next page are now integrated into the displayed page. In one implementation, the transition feature 144 corresponds to a darkened or colored screen (e.g., blue screen) which appears and fades quickly. The transition feature 144 may be triggered with the page update 127 to the current page 102.

Among other benefits, the current page 102 may be maintained in the user's browsing session, even after the user has selected to view additional pages (and content from those pages have been displayed). Some embodiments recognize that as a result of maintaining the current page 102 loaded in the browser, additional functionality and services may be integrated into the user's browsing experience. For example, the current page 102 may be equipped with push services that take several minutes to load and/or appreciate by the user. Under conventional approaches, users are likely to navigate from a website's main page within a short time span (e.g., seconds), precluding use of push or enhanced services. Under an embodiment such as described with FIG. 1, the current page is loaded and maintained in the web browser. The duration of the current page's presence with the browser is significantly longer, making push and other enhanced services feasible to establish on the current page.

Figure 2:
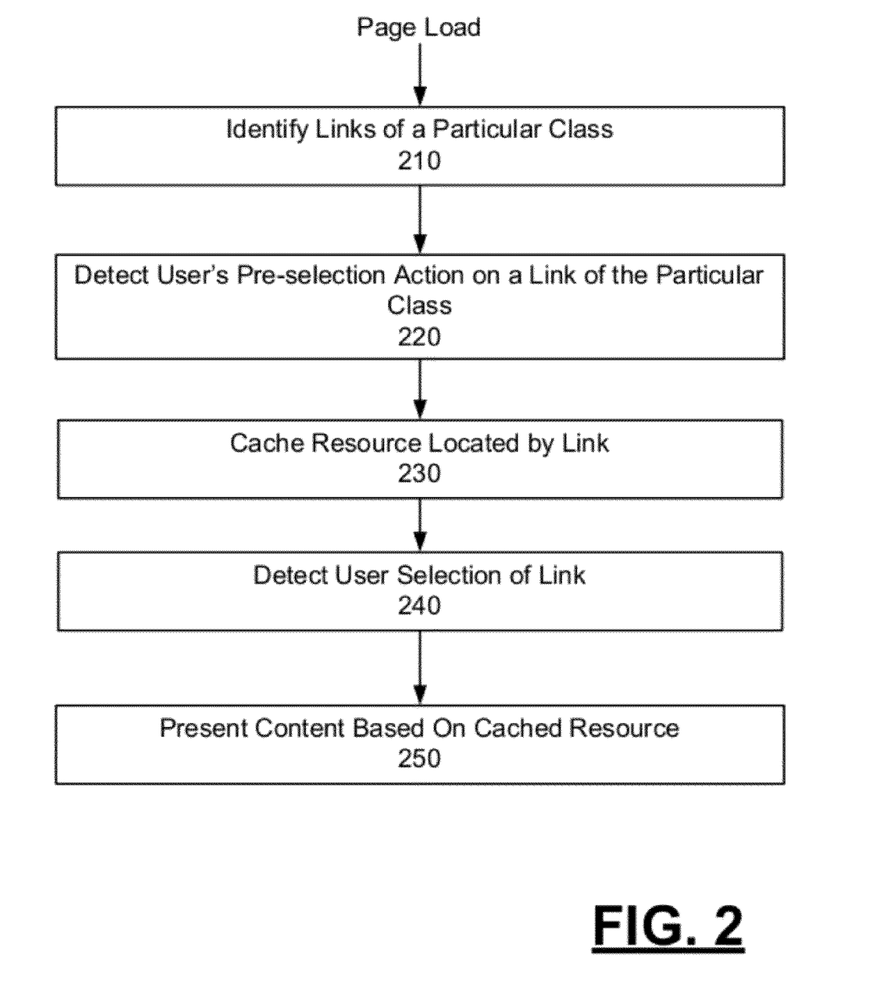
FIG. 2 illustrates a method for caching select links of a web page in web page content, according to one or more embodiments.

FIG. 2 illustrates a method for caching select links of a web page in presenting web page content, according to one or more embodiments. In describing a method of FIG. 2, reference may be made to elements of FIG. 1 for purpose of illustrating suitable elements or components for performing a step or sub-step being described.

With reference to FIG. 2, a user may operate a computer in order to implement a page download. In some implementations, the page download may correspond to the user downloading a home page or main page of a website. When the page is downloaded by the browser, select links are identified on the web page (210) for asynchronous retrieval (e.g., pre-caching). The select links may be of a class that locates web pages or resources which have elements which are similar to that of the host page. For example, the select links may correspond to links that are within the domain of the website. Certain types of links, such as advertisements, links to out-of-domain sites, and/or links to content of a different nature, can be excluded from being associated with the pre-caching functionality.

In one embodiment, user activity with the webpage is monitored to identify any pre-selection actions of the user that indicate the user's intent to select a particular link (220). The pre-selection actions may correspond to, for example, (i) the user moving the cursor over a link, (ii) the user moving the cursor over a link and pausing for a duration (e.g., 50 ms), and/or (iii) the user moving the cursor over the link, then off the link, and then moving it back over the link.

Once the pre-selection action is detected, the resource located by the link that is the subject of the pre-selection action is retrieved and cached (230). For example, the caching component 130 loads the link by making a HTTP request for the full document that is located by the link of the pre-selection action.

The user's selection action may be identified for a link after it is pre-cached (240). For example, the user may move the cursor over a link (pre-cache trigger) and click it (selection). Once the pre-cached link is selected, content from the page or resource located by the pre-cached link is locally retrieved and presented to the user (250). According to some embodiments, the presentation component 140 integrates the content from the pre-cached link into the current page that is displayed. The result is that the user is not navigated away from the current page. However, the viewer is able to view at least those portions of the next page which are pertinent-such as content of the next page that is not present in the current page.

Figure 3:
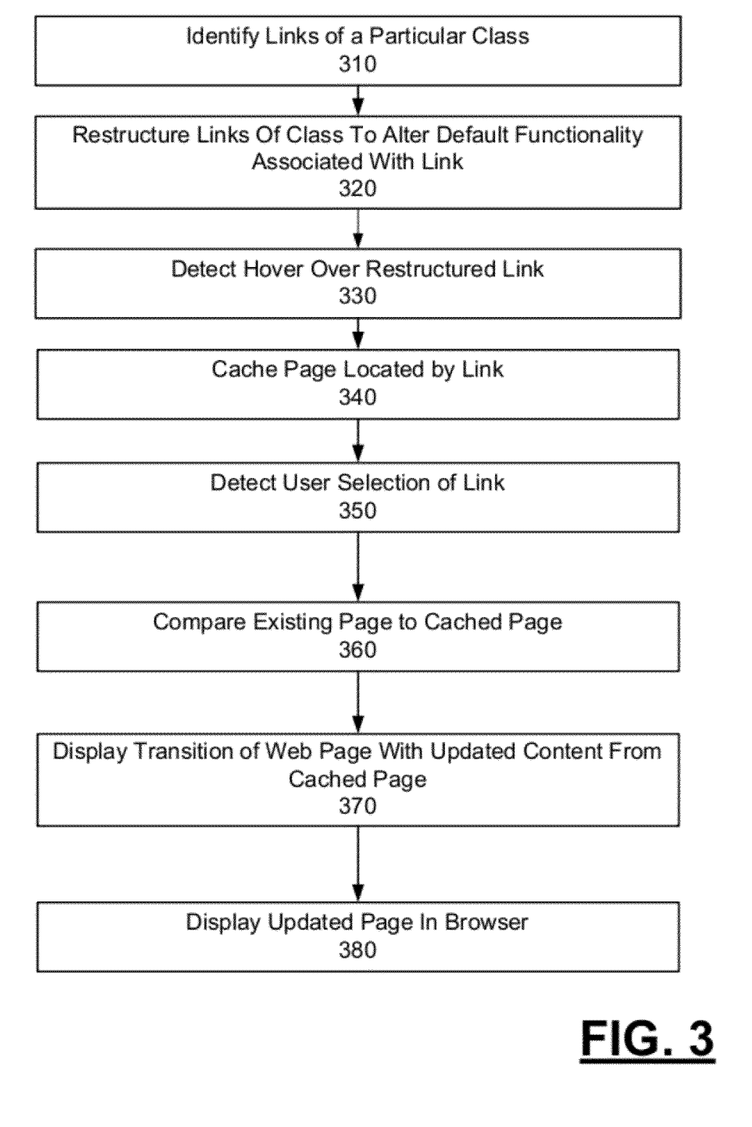
FIG. 3 illustrates a method for updating a web page with elements provided by another page that the user has selected to view, according to still another embodiment.

FIG. 3 illustrates a method for updating a web page with elements provided by another page that the user has selected to view, according to still another embodiment. In describing a method of FIG. 3, reference may be made to elements of FIG. 1 for purpose of illustrating suitable elements or components for performing a step or sub-step being described.

With reference to an embodiment of FIG. 3, a user may operate a computer in order to implement a page download. In some implementations, the page download may correspond to the user navigating to a website, and then viewing the home or main page of the website. When the page is downloaded by the browser, select links are identified on the web page (310). The select links may be of a class that locates web pages or resources which have elements which are similar to the home page. For example, the link restructure component 110 may identify links that are within the same domain of the current page, while ignoring those links which are to resources outside of the domain (e.g., third-party sites, advertisements, etc.). The links that are identified may be viewed as candidates for pre-caching.

The links that are identified as pre-caching candidates can be restructured to alter their default behavior (320). Specifically, the pre-caching candidate links may be restructured so that the browser is not able to use the links to make a document request. Rather, the caching component 130 is able to use each of the pre-caching candidate links to make a full HTTP request for a corresponding document. The restructured links 105 may be presented on, for example, the main page in a manner that is transparent to the user. Thus, the restructured links 105 may appear as they would under default behavior.

In an embodiment, the restructured links 105 include character insertions that alter the functionality and behavior associated with the links. In one implementation, the links are provided with characters "#!" to cause the browser component 10 to not act on the link (even when the user selects the link). The caching component 130 is configured to make document requests for resources located by URLs with the special characters.

A pre-selection action may be associated with the restructured links of the downloaded page (330). More specifically, some embodiments recognize that that certain user actions, such as a cursor pause (hovering) over a link, are highly indicative of a user's intent to select the link. Such selection pauses may be assumed to last at least a specific duration (e.g., 500 ms or more), on average, for a given population (empirical data may be used). A pre-selection action may be defined by a pause of a cursor movement over a restructured links that lasts a given duration that is a fraction of the pause typically observed by users of the population to select the particular link. For example, assuming that users hover over a link for at least 500 ms before selecting that link, the trigger for pre-caching that link may occur at, for example, 50 ms or 100 ms. According to embodiments, the hover (or mouse)-over duration that triggers the pre-caching is between 25-500 ms.

When the pre-selection action occurs, the caching component 130 makes a full HTTP request for the document provided by the link that is subject to the pre-selection action (340). The page or resource located by the particular link is thus retrieved in advance of user selection.

The user may then make a selection of the link (350) (e.g., 400 ms after the pre-caching is initiated). When selection of the pre-cached link is made, the page located by the link is retrieved locally and compared to the existing page (360). Alternatively, some embodiments provide that each cached page 132 is compared to the current page when it is retrieved in order to determine (in advance of user selection) the differences between the cached page and the current page. Various comparison techniques may be implemented, such as: (i) replace specific elements or portions of current page with those of the cached page regardless of whether there is an actual difference; (ii) compare elements or portions of current page to those of the cached page, and insert portions of cached page where different; (iii) compare elements or portions of current page to those of the cached page, and insert some portions of the cached page based on logic or rules for determining replacements. According to various embodiments, duplicative elements such as headers and footers are eliminated from the next page. Additional elements such as provided by Javascripts may also be eliminated from rendering.

Once the current page 102 is updated with portions or elements of the next page, the current page 102 is displayed to the user (380). In displaying the current page, some embodiments provide that a transition feature is displayed to the user to visually notify to the user that the page has been updated (370).

While some embodiments of FIG. 2 or FIG. 3 describe pre-caching operations as being performed responsive to a particular user input (e.g., pre-selection action), alternative embodiments may implement selective caching for the next page using other mechanisms. In one embodiment, a select number of links on a given page are identified as being candidates for pre-caching. Each of these links may be pre-cached without regard to actions that are indicative of pre-caching. For example, if a given home page has a select number of links that are candidates for pre-caching, each of these links may be pre-cached when the main page loads.

Still further, the pre-caching may be performed for some links that are identified by alternative mechanisms, such as, for example, profiling. For example, a user's profile may indicate that a user's pattern in navigating from a home page. The pattern may be used to identify which links on the page are to be pre-cached.

Computer System

Figure 4:
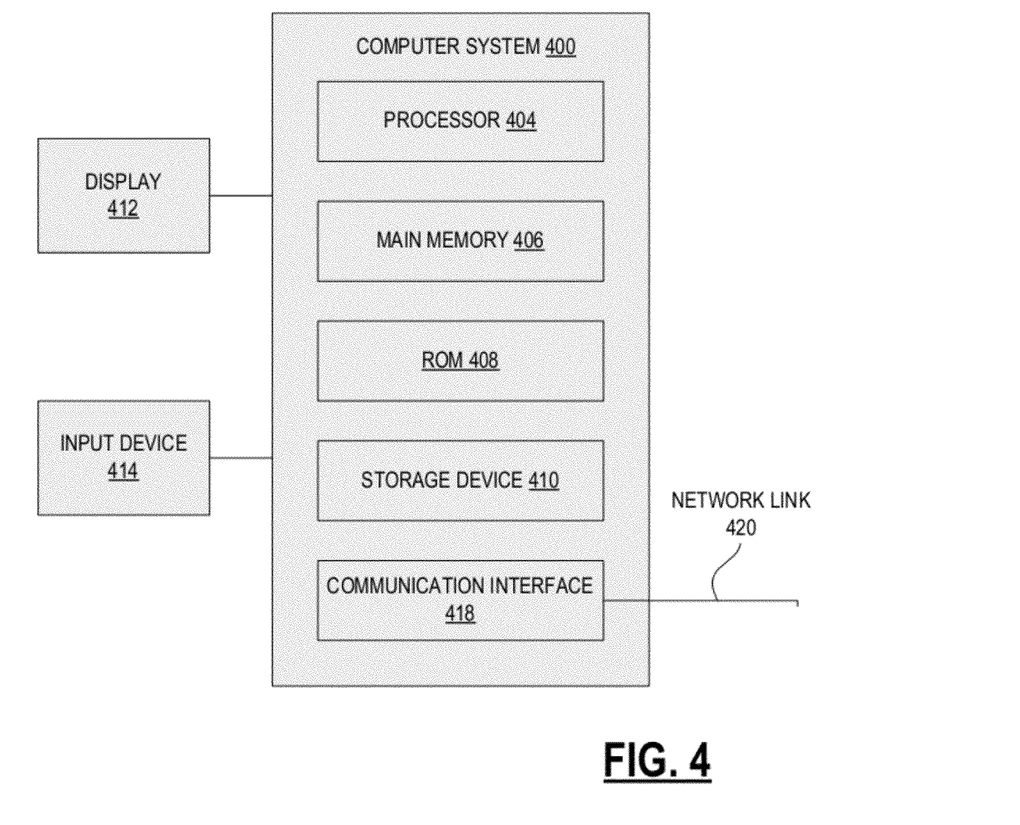
FIG. 4 is a block diagram that illustrates a computer system upon which embodiments described herein may be implemented.

FIG. 4 is a block diagram that illustrates a computer system upon which embodiments described herein may be implemented. For example, in the context of FIG. 1, system 100 may be implemented using a computer system such as described by FIG. 4.

In an embodiment, computer system 400 includes processor 404, main memory 406, ROM 408, storage device 410, and communication interface 418. Computer system 400 includes at least one processor 404 for processing information. Computer system 400 also includes a main memory 406, such as a random access memory (RAM) or other dynamic storage device, for storing information and instructions to be executed by processor 404. Main memory 406 also may be used for storing temporary variables or other intermediate information during execution of instructions to be executed by processor 404. Computer system 400 may also include a read only memory (ROM) 408 or other static storage device for storing static information and instructions for processor 404. A storage device 410, such as a magnetic disk or optical disk, is provided for storing information and instructions. The communication interface 418 may enable the computer system 400 to communicate with one or more networks through use of the network link 420.

Computer system 400 can include display 412, such as a cathode ray tube (CRT), a LCD monitor, and a television set, for displaying information to a user. An input device 414, including alphanumeric and other keys, is coupled to computer system 400 for communicating information and command selections to processor 404. Other non-limiting, illustrative examples of input device 414 include a mouse, a trackball, or cursor direction keys for communicating direction information and command selections to processor 404 and for controlling cursor movement on display 412. While only one input device 414 is depicted in FIG. 4, embodiments may include any number of input devices 414 coupled to computer system 400.

Embodiments described herein are related to the use of computer system 400 for implementing the techniques described herein. According to one embodiment, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hardwired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A computer implemented method for displaying content, the method being implemented by one or more processors and comprising:
   (a) identifying, on a current web page, a plurality of links from a set of current web page links, the plurality of links having a common network domain with respect to the current web page, wherein each of the plurality of links initially includes a selectable function to direct a given browser to a corresponding resource within the common network domain;
   (b) restructuring each of the plurality of links to be triggerable upon an occurrence of a detectable condition in order to automatically cache content from the corresponding resource associated with each of the plurality of links, wherein the cached content includes only content elements that are not included on the current web page;
   (c) while the current web page is being displayed, detecting a user action indicative of a desire to view content from a particular link in the plurality of links; and
   (d) in response to detecting the user action, replacing one or more portions of the current web page with the cached content corresponding to the particular link, the one or more portions of the current web page corresponding to content that is different from the cached content of the particular link, wherein replacing the one or more portions of the current web page is performed without navigating the given browser to a new web page.

2. The method of claim 1, wherein the user action is a user hover-over that has paused over the particular link.

3. The method of claim 2, wherein (c) further includes detecting that the user hover-over has paused over the particular link for a minimum duration that is between 25-500 milliseconds.

4. The method of claim 1, wherein the user action includes the user clicking on the particular link.

5. The method of claim 1, wherein (d) includes sending a page request to the common network domain to retrieve the cached content of the particular link.

6. The method of claim 5, wherein the page request is a full Hypertext Transfer Protocol (HTTP) request.

7. The method of claim 1, further comprising, in response to restructuring each of the plurality of links, monitoring user activity on the current web page for detectable conditions and subsequent predetermined user actions indicative of a desire to view content from any link in the identified plurality of links, wherein each of the predetermined user actions trigger replacing one or more portions of the current web page with the cached content corresponding to any link in the identified plurality of links.

8. The method of claim 7, wherein the predetermined user actions include (i) a user hovering a cursor over a specified link in the plurality of links for more than 500 milliseconds, and (ii) a user moving the cursor over the specified link, then off the specified link, and then moving the cursor back over the specified link before a preconfigured time period.

9. The method of claim 1, wherein replacing the one or more portions of the current web page with the cached content corresponding to the particular link includes displaying a fade transition of the one or more portions of the current web page to display the corresponding cached content of the particular link.

10. The method of claim 1, wherein automatically caching the content from the corresponding resource is performed on a Document Object Model (DOM) basis under an assumption that content from the corresponding resource is similar to content on the current web page.

11. A system for displaying website content, the system comprising:
one or more processors to:
(a) identify, on a current web page, a plurality of links from a set of current web page links, the plurality of links having a common network domain with respect to the current web page, wherein each of the plurality of links initially includes a selectable function to direct a given browser to a corresponding resource within the common network domain;
(b) restructure each of the plurality of links to be triggerable upon an occurrence of a detectable condition in order to automatically cache content from the corresponding resource associated with each of the plurality of links, wherein the cached content includes only content elements that are not included on the current web page;
(c) while the current web page is being displayed, detect a user action indicative of a desire to view content from a particular link in the plurality of links; and
(d) in response to detecting the user action, replace one or more portions of the current web page with the cached content corresponding to the particular link, the one or more portions of the current web page corresponding to content that is different from the cached content of the particular link, wherein replacing the one or more portions of the current web page is performed without navigating the given browser to a new web page.

12. The system of claim 11, wherein the user action is a user hover-over that has paused over the particular link.

13. The system of claim 11, wherein the user action includes the user clicking on the particular link.

14. The system of claim 12, wherein (c) further includes detecting that the user hover-over has paused over the particular link for a minimum duration that is between 25-500 milliseconds.

15. The system of claim 11, wherein (d) includes sending a page request to the common network domain to retrieve the cached content of the particular link.

16. The system of claim 15, wherein the page request is a full Hypertext Transfer Protocol (HTTP) request.

17. The system of claim 11, wherein the one or more processors are further configured to, in response to restructuring each of the plurality of links, monitoring user activity on the current web page for detectable conditions and predetermined user actions indicative of a desire to view content from any link in the identified plurality of links, wherein each of the predetermined user actions trigger replacing one or more portions of the current web page with cached content corresponding to any link in the identified plurality of links.

18. The system of claim 17, wherein the predetermined user actions include (i) a user hovering a cursor over a specified link in the plurality of links for more than 500 milliseconds, and (ii) a user moving the cursor over the specified link, then off the specified link, and then moving the cursor back over the specified link before a preconfigured time period.

19. The system of claim 11, wherein replacing the one or more portions of the current web page with the cached content corresponding to the particular link includes displaying a fade transition of the one or more portions of the current web page to display the corresponding cached content of the particular link.

20. The system of claim 11, wherein automatically parsing and caching the content from the corresponding resource is performed on a Document Object Model (DOM) basis under an assumption that content from the corresponding resource is similar to content on the current web page.

* * * * *